United States Patent

Ohashi et al.

[11] Patent Number: 6,147,470
[45] Date of Patent: Nov. 14, 2000

[54] DEVICE FOR CONTROLLING INDUCTION MOTOR AND METHOD OF CONTROLLING THE SAME

[75] Inventors: Hironori Ohashi; Makoto Takase; Hiroyuki Tomita, all of Funabashi; Seiji Ishida, Hitachi, all of Japan

[73] Assignee: Hitachi, Ltd., Tokyo, Japan

[21] Appl. No.: 09/254,707

[22] PCT Filed: Sep. 13, 1996

[86] PCT No.: PCT/JP96/02625

§ 371 Date: Mar. 12, 1999

§ 102(e) Date: Mar. 12, 1999

[87] PCT Pub. No.: WO98/11663

PCT Pub. Date: Mar. 19, 1998

[51] Int. Cl.$^7$ ................................. H02P 3/00; H02P 5/40
[52] U.S. Cl. ........................... 318/757; 318/727; 318/798
[58] Field of Search ..................... 318/727, 757, 318/760–762, 798–801

[56] References Cited

U.S. PATENT DOCUMENTS

| 5,136,228 | 8/1992 | Yamada et al. | 318/800 |
| 5,532,571 | 7/1996 | Masaki et al. | 318/799 |
| 5,905,644 | 5/1999 | Blasko et al. | 318/801 |
| 6,014,007 | 1/2000 | Seibal et al. | 318/801 |

*Primary Examiner*—David Martin
*Assistant Examiner*—Marlon Fletcher
*Attorney, Agent, or Firm*—Antonelli, Terry, Stout & Kraus, LLP

[57] ABSTRACT

A vector control apparatus having a DC braking function which is insusceptible to trip even upon DC braking and scarcely suffers vibration upon stoppage is provided.

The control apparatus includes a DC braking control arithmetic unit 1 and switches S1, S3 and S4 controlled thereby, wherein in a vector control mode, the DC braking control arithmetic unit 1 sets all the switches S1, S3 and S4 to position a for realizing the vector control. When a DC control state is to be validated from the above-mentioned state, phase of voltage vector is calculated to change over the switches S1 and S3 to position b, and the absolute value of the q-axis current is compared with a reference value α. When the absolute value of the q-axis current is smaller than the reference value α, the switch S4 is changed over to the position b to thereby effectuate only the d-axis current control.

According to the present invention, there is provided a vector control apparatus having a tripless DC braking function. Since vibration occurring upon stoppage can be suppressed, stopping position accuracy upon DC braking in emergency can be enhanced. Further, low-noise systems are made available.

9 Claims, 4 Drawing Sheets

DEVICE FOR CONTROLLING INDUCTION MOTOR AND METHOD OF CONTROLLING THE SAME

TECHNICAL FIELD

The present invention relates to an induction motor control apparatus having a DC braking function realized by performing a current control with a rotatory coordinate system.

BACKGROUND ART

In conjunction with the control of the induction motor, there are known a V/f control for controlling the rotation speed of the motor by changing a motor- applied voltage V and a frequency f in a predetermined ratio and a vector control for controlling the induction motor in a manner similar to the control of a DC motor by decomposing the motor current into a magnetic flux corresponding or equivalent component (referred to as d-axis current) and a torque equivalent component (referred to as q-axis current). Heretofore, the first mentioned V/f control has been adopted widely because of simplicity of the control scheme. On the other hand, the second mentioned vector control has found practical applications in place of the conventional DC servo control because of capability of arithmetic operations involved in the control on a real time basis owing to advancement of microcomputer technology.

With the first-mentioned V/f control, torque is unavailable in a low speed region due to a voltage drop brought about by resistance of the armature while encountering difficulty with regard to the positioning. Such being the circumstances, there has been adopted a DC braking for applying brake by causing a DC current to flow through the induction motor.

On the other hand, with the second mentioned vector control, there can be ensured a sufficient magnitude of torque even in the low speed region, and the positioning can equally be realized. However, in the vector control, speed (position) information is required. For this reason, the induction motor has to be equipped with a position sensor such as an encoder for detecting the speed of the induction motor or a speed estimating device for estimating the motor speed on the basis of current and voltage. For coping with failure occurring in these speed detecting means, the aforementioned DC braking is adopted in many cases for realizing emergency stoppage of the induction motor.

Thus, in many practical applications, the second mentioned vector control apparatus is operated similarly to the V/f control type induction motor control apparatus in the DC braking mode by resorting to the same control procedure as the conventional one. Parenthetically, the procedure for controlling the DC braking resides simply in applying to the induction motor a DC voltage corresponding to a desired DC braking force.

FIG. 4 is a block diagram showing a hitherto known or conventional vector control apparatus imparted with a DC braking function. As can be seen in FIG. 4, in the conventional vector control apparatus, there are provided a DC braking control arithmetic unit 1 and switches S1 and S2 in order to realize the DC braking function in addition to arithmetic units 2 to 12 provided inherently for the vector control. In the vector control state, the switches S1 and S2 are closed to the position a while in the DC braking mode, the switches S1 and S2 are closed to the position b. By setting the switch S2 to the position b, the output of a d,q-axis current controller 4 is rendered ineffective, whereby one voltage (vd*) is set to an input value corresponding to a braking force while the other voltage (vq*) being set to zero, as a result of which a DC voltage is applied to an induction motor 13. Further, in order to suppress change-over shock, the switch S1 is so operated as to allow the DC braking control arithmetic unit 1 to arithmetically determine the voltage phase θv which coincides with the d-axis.

The vector control apparatus may be used for realizing servo function such as positioning, as occasion requires. Accordingly, the vector control apparatus is inhibited from stopping upon occurrence of overcurrent or the like event. Same holds true even in the case where the DC braking mode of the vector control apparatus is validated in an emergency. Since the vector control apparatus can ensure sufficient torque even in a low speed region and is capable of performing positioning operation, the DC braking is not required intrinsically. However, when taking into consideration the failure of the position (speed) sensor mentioned previously, the DC braking mode is considered as an indispensable control mode for the vector control apparatus.

At this juncture, it should be mentioned that when the conventional DC braking procedure is adopted intactly, there may arise such a situation in which the apparatus is tripped for protecting itself against overcurrent which may occur upon change-over of the operation mode from the vector control to the DC braking mode. Such trip is likely to take place when the rotation speed is large with the current being easy to increase or when effective load is heavy, because sufficient current control is impossible only with the application of DC voltage as in the case of the conventional DC braking. Since in the vector control apparatus, the DC braking is validated upon occurrence of failure, as described above, it is impossible to limit the condition for validating the DC braking to such a load state where the trip is difficult to occur. Thus, there exists a demand for a DC braking procedure which does not incur the trip in any state.

An object of the present invention is to provide a trip-insusceptible DC braking procedure incarnated in a vector control apparatus of high performance. Further, a second object of the present invention is to provide a DC braking procedure which incurs less vibration upon stoppage.

SUMMARY OF THE INVENTION

For achieving the first-mentioned object, the vector control apparatus includes a d,q-axis current controller (ACR) for setting either one current command of a d-axis current command or a q-axis current command to zero while using the other current command as a current command indicative of or corresponding to a DC braking force as an input for thereby realizing a DC braking mode. Further, for achieving the second-mentioned object, there is provided change-over means for controlling the current of the induction motor with only the other current command mentioned above while setting the above-mentioned one axis control current to zero (i.e., vg*=0) when the absolute value of the one axis current value for which the current command has been set to zero or the rotation speed of the induction motor is smaller than a predetermined reference value.

By virtue of the arrangement that the d,q-axis current controller of the vector control apparatus is put into operation even in the DC braking mode as mentioned above, the current of the induction motor can be control- led in any load state with the trip due to overcurrent being evaded. Further, since the change-over to the DC braking can be realized simply by controlling the command current for the d,q-axis current controller, the voltage of the power converter can sustain continuity substantially regularly before and after the change-over. Thus, change-over ascribable shock can be mitigated, which in turn means that trip is difficult to occur upon change-over operation.

When the DC braking is put into operation with both the d-axis current control and the q-axis current control, the rotational position of the rotor may undergo fine vibration or deflection immediately before stoppage of the motor because the voltage vector may be outputted at any of the phase angles over 360°. Accordingly, when the axis current constricted to zero or the rotation speed of the induction motor becomes smaller than a reference value, the control is performed only with the aforementioned other axis current. Thus, the voltage output direction is restricted to only the direction of the other axis current undergoing the current control, whereby the rotor is protected against vibration upon stoppage thereof.

DETAILED DESCRIPTION OF THE INVENTION

Figure 1:
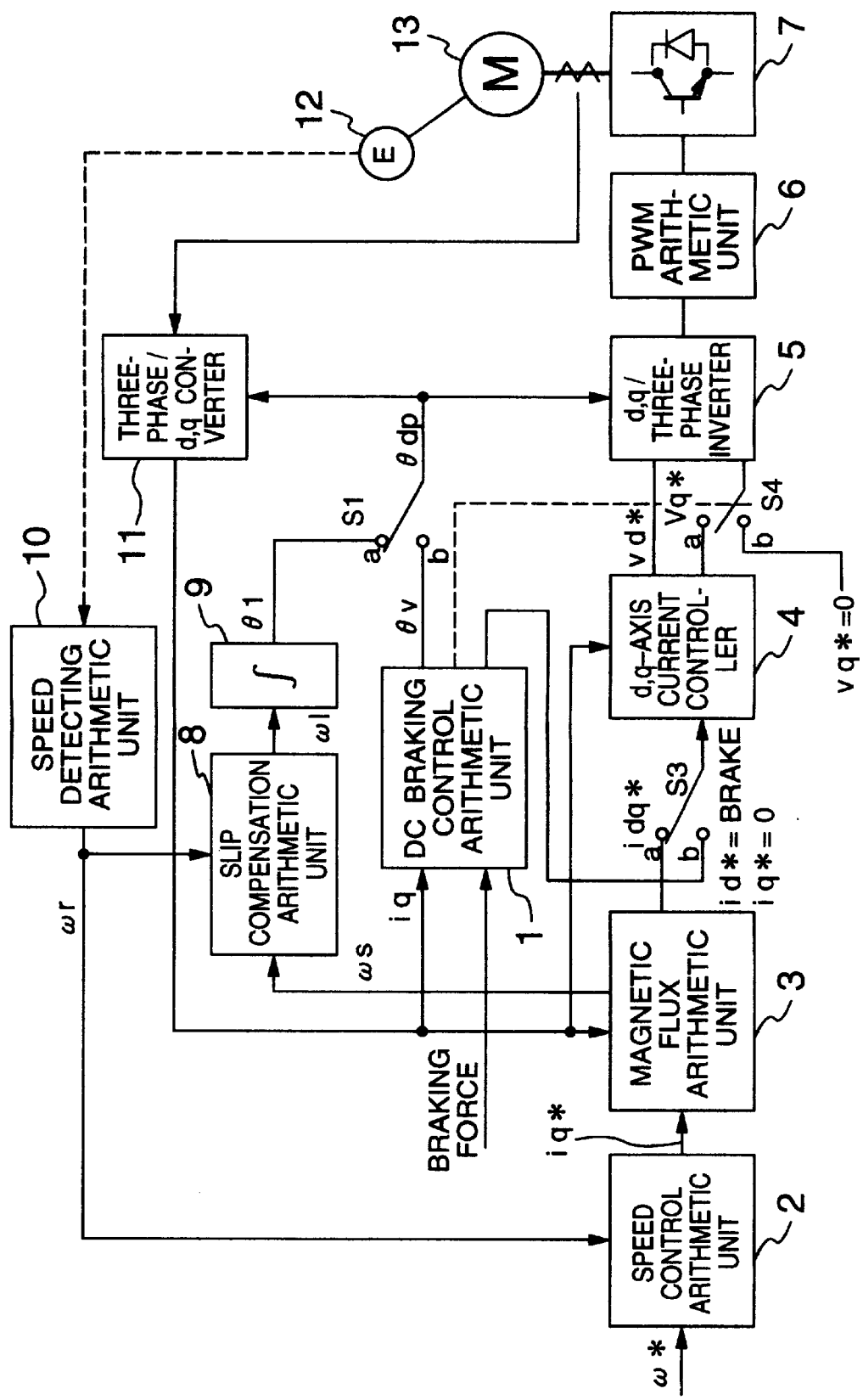
FIG. 1 is a control block diagram showing an exemplary embodiment of the present invention.

In the following, an exemplary embodiment of the present invention will be described by reference to FIG. 1. Shown in FIG. 1 is a vector control apparatus for an induction motor, which apparatus is designed for controlling an induction motor 13 through the medium a power converter circuit 7. For facilitating understanding of the invention incarnated in the instant exemplary embodiment, description will be made in conjunction with a speed control system.

The control concept incarnated in the vector control apparatus according to the instant exemplary embodiment shown in FIG. 1 is same as the vector control equipped with the speed sensor well known in the art, wherein d-axis and q-axis constitute a coordinate system rotating in synchronism with a rotating magnetic field of the induction motor. A speed control arithmetic unit 2 is designed to arithmetically determine a torque current (i.e., torque-equivalent current) command iq* on the basis of a speed command ω* inputted from a system external of the vector control apparatus and a speed detection value or inputted from a speed detecting arithmetic unit 10, which in turn is so designed as to arithmetically determine the signal on the basis of a speed outputted from a position detector 12 implemented by an encoder or the like. Unless the position detector is provided, the speed detecting arithmetic unit 10 may be so designed as to arithmetically estimate the speed on the basis of the motor current. The torque equivalent current command iq* is inputted to a magnetic-flux arithmetic unit 3 which is designed to arithmetically determine a magnetic-flux equivalent current command id* and a slip frequency ωs which satisfy the conditions for the vector control, as is well known in the art. Thus, the magnetic-flux equivalent current command id*, the torque equivalent current command iq* and the slip frequency ωs are outputted from the magnetic flux arithmetic unit 3. On the basis of these current commands id* and iq*, a d,q-axis current controller 4 arithmetically determines a magnetic-flux equivalent voltage command vd* and a torque equivalent voltage command vq* which make current detection values id and iq outputted from a three-phase/d,q converter 11 to follow the magnetic-flux equivalent current command id* and the torque equivalent current command iq*, respectively.

These d- and q-axis voltage commands vd* and vq* are converted into three-phase voltage command by means of a d,q/three-phase inverter 5 which is designed for converting the d- and q-axis voltage components of the rotatory coordinate system into a three-phase voltage, whereon a firing pattern for turning on/off the switching elements of the power converter 7 is arithmetically determined by a PWM arithmetic unit 6. On the other hand, the slip frequency ωs outputted from the magnetic flux arithmetic unit 3 is inputted to a slip compensation arithmetic unit 8 which is designed for arithmetically determining a primary frequency ω1 of the induction motor, and then the primary frequency ω1 is integrated by an integrator 9 to thereby calculate the phase θ1 of the d-axis. The output of the integrator 9 is inputted to the three-phase/d,q converter 11 and the d,q/three-phase inverter 5.

Figure 2:
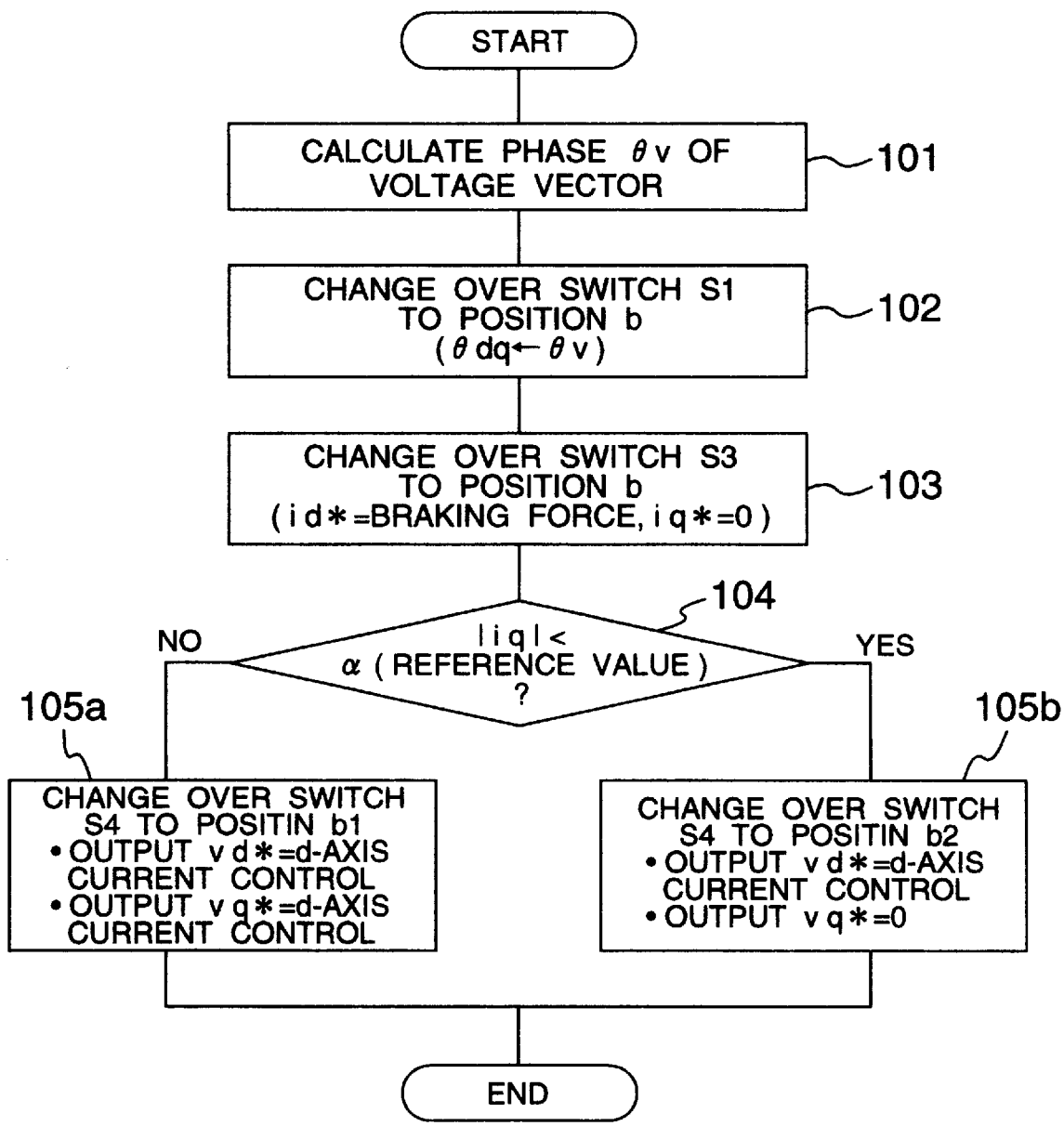
FIG. 2 is a flow chart for illustrating operation of a DC braking arithmetic unit according to an exemplary embodiment of the present invention.

The present invention features an arrangement comprised of a DC braking control arithmetic unit 1 and switches S1, S3 and S4 controlled by the DC braking control arithmetic unit 1. Inputted to the DC braking control arithmetic unit 1 are a desired braking force value for the DC braking and a DC braking command (not shown) for making transition to the DC braking operation. In the vector control mode, all the switches S1, S3 and S4 are set to the positions a, respectively, by means of the DC braking control arithmetic unit 1, whereby the vector control is carried out in such manner as described previously. In the following, description will be directed to the operation of the DC braking control arithmetic unit 1 for realizing the DC braking control state, starting from the vector control state, by reference to a flow chart shown in FIG. 2.

Figure 3:
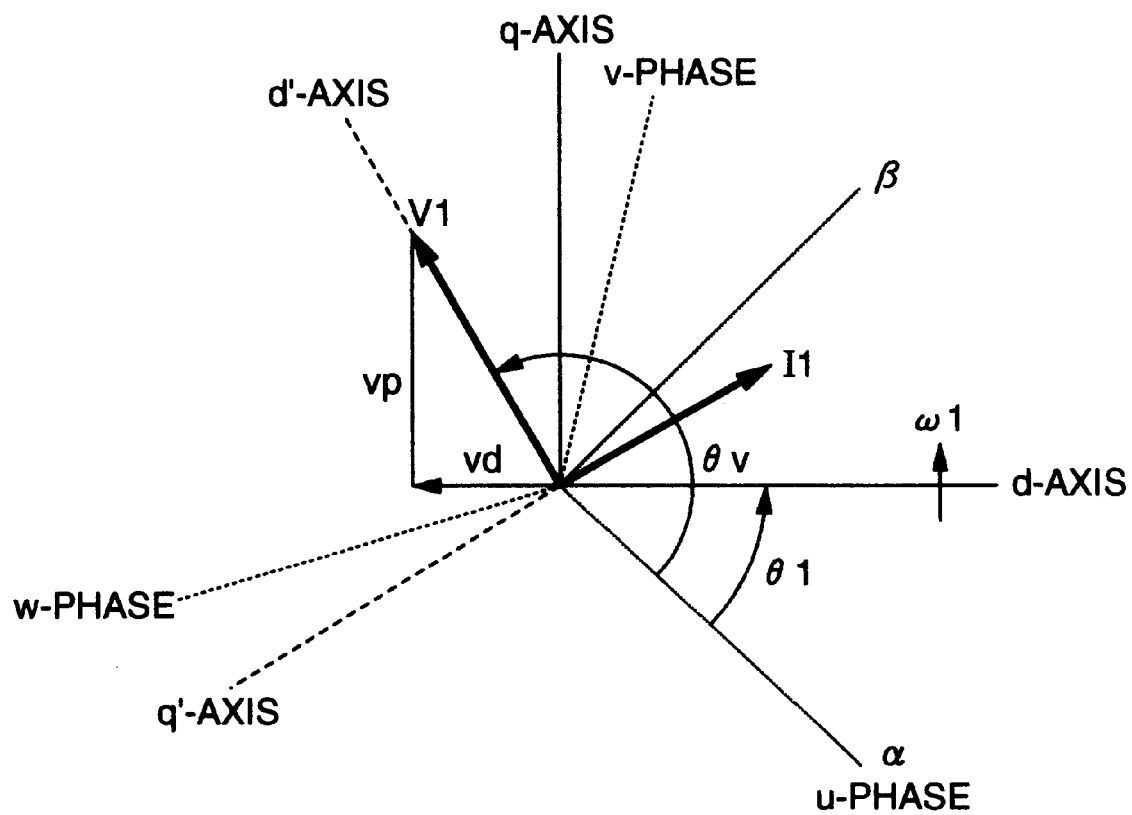
FIG. 3 is a vector diagram for illustrating voltage and current on a d,q-axis coordinate system.
Figure 4:
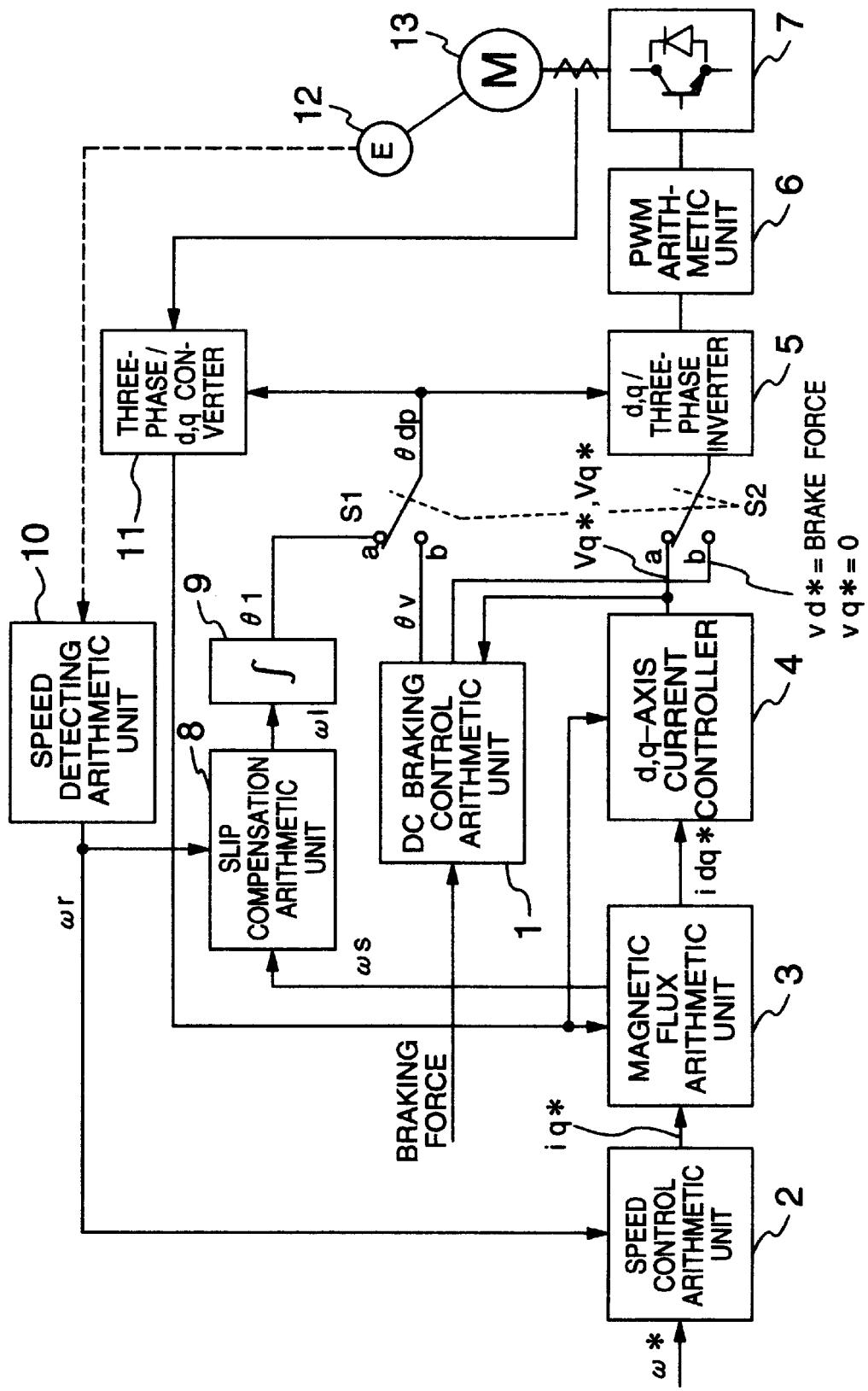
FIG. 4 is a control block diagram of a conventional control apparatus known heretofore.

The DC braking control arithmetic unit 1 determines arithmetically the phase of the voltage vector θv (step 101). This arithmetic step may be executed only at the moment the vector control is changed over to the DC braking control. Relations among phases u, v and w of three windings of the induction motor, d,q-axis voltage vector V1 and current vector Ii are such as illustrated in FIG. 3. As can be seen in the figure, the voltage vector θv can be determined in accordance with $$\theta v = \theta 1 + \tan^{-1}(Vq/Vd) \qquad (1)$$

where Vq and Vd represents the d- and q-axis voltage values determined arithmetically immediately before the change-over to the DC braking control state. Subsequently, the switch S1 is changed over to the position b so that the voltage vector θv is outputted as θdq (step 102). Thus, the d-axis is aligned with the phase of the voltage vector Vi, as indicated by d'-axis in FIG. 3, with a view to preventing the voltage vector V1 from becoming discontinuous upon change-over to the DC braking mode. By virtue of this feature, shock which may occur upon change-over to the DC braking mode can be mitigated with the trip being rendered difficult to occur. In the case of the instant example, the voltage vector V1 is made to be continuous. It should however be understood that the current vector I1 may be changed continuously. In that case, "V" appearing in the expression (1) must be replaced by "i". The change-over procedure mentioned above may be omitted when the d,q-axis current controller (ACR) exhibits high-speed response because then continuity of the voltage or current vector can be automatically realized. By contrast, in case the d,q-axis current controller exhibits low-speed response, the change-over procedure mentioned above is very effective.

Subsequently, the switch S3 is changed over to the position b to allow a value conforming to the braking force inputted to the DC braking control arithmetic unit 1 to be supplied to the d,q-axis current controller 4 as the d-axis current control command id* while the q-axis current control command iq* is set to zero (step 103). In this manner, the d-axis and q-axis current controls or ACR are sustained effective even in the DC braking mode, differing from the conventional control scheme. Thus, there can be avoided such situation in which the current increases to an overcurrent level involving the trip under the load state of the AC motor.

Then, the absolute value of the current detection value iq is compared with a predetermined reference value α (step 104). When the former is greater than the latter, the switch S4 is changed over to the position a for allowing the output of the d,q-axis current controller 4 to be inputted to the PWM arithmetic unit 6 (step 105a). On the contrary, in case the absolute value of the current detection value iq is smaller than the reference value α, the switch S1 is changed over to the position b for allowing the d-axis output of the d,q-axis current controller 4 to be effective with the q-axis voltage command Vq* being set to zero, i.e., the q-axis current control being invalidated, whereon the voltage command is supplied to the PWM arithmetic unit 6 (step 105b). By virtue of provision of the steps 104 and 105, the rotor of the AC motor can be protected against vibration which may otherwise occur upon positioning and stoppage thereof. The reason why such vibration takes place upon positioning/stoppage can be explained by the fact that when both the d- and q-axis current controls or ACRs are left active, the d- and q-axis components may be outputted in all the directions over 360°, as can be seen from the voltage vectors illustrated in FIG. 3, which results in that the output of the d,q-axis current controller becomes vibratory due to the q-axis voltage component, giving rise to vibration of the rotor.

In the foregoing description, it h as been assumed that the reference value α is employed as a threshold value for changing over the switch S4. In this conjunction, it is noted that the current may become vibratory or superposed with noise, resulting in that the switch may flap upon change-over thereof, as the case may be. Such event can be prevented by imparting several to several ten percentages of hysteresis to the reference value α. Furthermore, by changing the reference value α in dependence on the braking force, vibration of the rotor upon stoppage thereof can be decreased. By way of example, when the braking force corresponds equivalently to 40% of the rated current of the induction motor, then the d-axis current command is 40% while when the braking force is equivalent to 80%, then the d-axis current command will correspondingly be 80%. Since the interference voltage ascribable to the d-axis current becomes different even for a same rotation speed, the reference value α should be set at a large value so that only the d-axis component becomes effective earlier for the braking force of 80% when compared with the braking force of 40%. In that case, the vibration can be decreased upon stoppage of the motor. Further, the reference value α should be selected smaller than the overcurrent detecting level, needless to say. By setting the reference value α at a value not greater than 80% of the overcurrent detecting level, the trip is difficult to occur while the vibration accompanying the stoppage of the motor can be reduced.

In the foregoing, description has been made only for convenience's sake on the assumption that the q-axis current control command iq* is set to zero. However, substantially same effect can be realized by setting the d-axis current control command id* to zero. In this case, the voltage vector θv is arithmetically determined in accordance with the undermentioned expression (2) so that the q'-axis is aligned with the voltage vector V1 instead of aligning the d'-axis with the voltage vector V1 as shown in FIG. 3, while in the flow chart shown in FIG. 2, the suffix "d" should be read as "q" and vice versa, needless to say.

$$\theta v = \theta 1 + \tan^{-1}(Vq/Vd) - \pi/2 \tag{2}$$

Furthermore, when the current vector I1 should be made continuous, as mentioned previously, "V" appearing in the expression (2) should read "i", as noted hereinbefore.

Furthermore, when the d- and q-axis current control is to be validated, it is preferred that a d,q-axis interference voltage is arithmetically determined to be added to the output of the d,q-axis current controller as a feed-forward quantity to cancel out the d,q-axis interference voltage for thereby realizing a non-interference control. According to the teachings of the invention, the d,q-axis current control is effectuated even in the DC braking mode, the non-interference control is effective for suppressing vibration of the d- and q-axis currents and hence vibration of the rotor upon stoppage of the motor. In this case, the interference voltage may be arithmetically determined on the presumption that the primary frequency ω1 is zero. In this conjunction, there may be conceived various formulae for arithmetic determination of the interference voltage. By way of example, it is assumed that an interference voltage Vzdq given by the following expression is to be made non-interferential.

$$\begin{pmatrix} v_{zd} \\ v_{zq} \end{pmatrix} = \begin{pmatrix} -\omega_1 l_\sigma \cdot i_q^* \\ \omega_1 l_\sigma \cdot i_d^* + \omega_r M / L_2 \cdot \phi^* \end{pmatrix} \tag{3}$$

where la represents leakage inductance, M represents mutual inductance, L2 represents secondary self-inductance, T2 represents secondary time constant, ωr represents angular frequency of rotor in terms of electrical angle and φ* represents secondary magnetic-flux command.

In the above expression, when $$\omega_1 = 0 \tag{4}$$

then $$\begin{pmatrix} v_{zd} \\ v_{zq} \end{pmatrix} = \begin{pmatrix} 0 \\ \omega_r M / L_2 \cdot \phi^* \end{pmatrix} \tag{5}$$

It can be seen that the interference voltage Vzdq can be made non-interferential.

Although the foregoing description has been directed to the vector control performed by making use of the speed sensor, it should be appreciated that the present invention can be applied to all the sorts of vector control apparatuses inclusive of the vector control apparatus equipped with no speed sensor.

In the foregoing description of the exemplary embodiment of the present invention, the phase of the current command is fixed at first upon DC braking of the induction motor and then the phase of the voltage command is fixed after the actual current component orthogonal to the phase of the fixed current command becomes smaller than a predetermined value inclusive thereof. At this juncture, it should be recalled that the current is likely to increase at a high rotation speed of the induction motor. Accordingly, for DC braking of the induction motor, the phase of the current command may first be fixed and subsequently the phase of the vector control is fixed after the rotation speed of the induction motor decreases below a predetermined value by changing over the switch S4 to the position b. Then, the overcurrent and vibration of the motor can equally be suppressed. In that case, the switch S4 is changed over back to the position a when the rotation speed of the induction motor again exceeds a predetermined rotation speed, increasing from the low-speed state under the action of a load. In the instant exemplary embodiment, the speed detection value $\omega r$ outputted from the speed detecting arithmetic unit 10 may be inputted to the DC braking control arithmetic unit 1 for thereby allowing the DC braking control arithmetic unit 1 to output a signal for changing over the switch S4 to the position b when it is decided by the DC braking control arithmetic unit 1 that the motor rotation speed becomes lower than the predetermined value.

As the system or machine to which the present invention can find application, there may be mentioned hoist machines such as a crane or the like. In the system such as crane or the like, the driving unit for lifting/lowering heavy weights is necessarily implemented with a large capacity. For this reason, the induction motor is employed in many cases. In the system of this sort, the DC braking system is adopted for preventing the weight from falling upon failure of the position sensor or the like event. In that case, the motor is constantly subjected to a load in the direction of gravity, and no trip must occur not only at the moment operation mode of the motor is changed over but also upon braking of the motor. With the control apparatus according to the present invention which is effective in the situations mentioned above and which can suppress the motor current from increasing by virtue of the two-axis current control. Besides, the induction motor can be controlled effectively without incurring trip even in emergency, preventing the weight or load from falling uncontrollably under the gravity, to an advantageous effect. Further, because the induction motor is steadily placed in the brake-applied state, the DC braking can equally be applied effectively notwithstanding of change in the load due to swinging of the weight by virtue of the two-axis current control effectuated upon increasing of the q-axis current. In many of the systems mentioned above, gears are employed. However, because the vibration can be suppressed upon stoppage, low noise operation can be ensured.

INDUSTRIAL APPLICABILITY

According to the present invention, there can be provided a vector control apparatus having a tripless DC braking function. Further, there can be provided a low-noise system which can ensure high accuracy for the position for stopping the operation of the system under the DC braking even in emergency because the vibration upon stoppage can be suppressed effectively.

What is claimed is:

1. An induction motor control apparatus in which a current supplied to an induction motor through a power converter for converting to an AC power of a given frequency is controlled, being divided into vector components corresponding to magnetic flux and torque, respectively, wherein said induction motor control apparatus comprises means for fixing phase of a current command in response to a DC braking command, and means for fixing phase of a voltage command when an actual current of phase component orthogonal to the fixed phase of said current command becomes smaller than a predetermined value inclusive thereof.

2. An induction motor control apparatus in which a current supplied to an induction motor through a power converter for converting to an AC power of a given frequency is controlled, being divided into vector components corresponding to magnetic flux and torque, respectively, wherein said induction motor control apparatus comprises means for fixing phase of a current command in response to a DC braking command, and means for fixing phase of a voltage command when rotation speed of said induction motor becomes smaller than a predetermined value inclusive thereof during DC braking operation.

3. An induction motor control apparatus including a power converter, an induction motor connected to the output of said power converter, a d,q-converter for decomposing vectorially the current of said induction motor into a d-axis current for generating magnetic flux and a q-axis current for generating toque, a current command arithmetic unit for arithmetically determining from a torque command value d,q-axis current command values to be outputted, and a d,q-axis current control arithmetic unit for arithmetically determining d,q-axis voltages such that said d,q-axis currents are caused to follow said d,q-axis current command values, for thereby controlling rotation of said induction motor, characterized in that upon reception of a DC braking command, said current command arithmetic unit sets one axis current command value of the d,q-axis current commands to zero while setting the other to a command value corresponding to a braking force to be outputted, and that said d,q-axis current control arithmetic unit controls said induction motor with only said other axis current when absolute value of said one axis current for which said current command value is set to zero is smaller than a predetermined value.

4. An induction motor control apparatus as set forth in claim 3, characterized in that said d,q-axis current control arithmetic unit compares the absolute value of the current with said predetermined value by using comparison means having hysteresis characteristic.

5. An induction motor control apparatus as set forth in claims 3 and 4, characterized in that said predetermined value is set to a value corresponding to a braking force commanded upon DC braking.

6. An induction motor control apparatus as set forth in claims 3 to 5, characterized in that the current compared with said predetermined value upon DC braking is the q-axis current.

7. An induction motor control apparatus as set forth in claims 3 to 6, characterized in that said predetermined value is set to be smaller than a value corresponding to 80% of an overcurrent detection level inclusive thereof.

8. In an induction motor control in which an induction motor and a power converter are employed for controlling a current supplied to said induction motor through said power converter by dividing the current into vector components, a method of controlling said induction motor by fixing at first phase of a current command upon DC braking of said induction motor and then fixing phase of a voltage command when an actual current of the phase component orthogonal to the phase of said fixed current command becomes smaller than a predetermined value inclusive thereof.

9. In an induction motor control in which an induction motor and a power converter are employed for controlling a current supplied to said induction motor through said power converter by dividing the current into vector components, a method of controlling said induction motor by fixing at first phase of a current command upon DC braking of said induction motor and then fixing phase of a voltage command when rotation speed of said induction motor becomes smaller than a predetermined value inclusive thereof.

* * * * *